(12) United States Patent
Ben Haim et al.

(10) Patent No.: US 11,738,591 B2
(45) Date of Patent: Aug. 29, 2023

(54) DRAWING ASSISTING TOOL

(71) Applicants: Moshe Ego, Beer Yaacov (IL); Adir Garji, Rishon LeZion (IL)

(72) Inventors: Moshe Ben Haim, Modi'in (IL); Moshe Ego, Beer Yaacov (IL); Adir Garji, Rishon LeZion (IL)

(73) Assignees: Moshe Ego, Beer Yaacov (IL); Adir Garji, Rishon Lezion (IL)

( * ) Notice: Subject to any disclaimer, the term of this patent is extended or adjusted under 35 U.S.C. 154(b) by 48 days.

(21) Appl. No.: 17/424,290

(22) PCT Filed: Jan. 21, 2020

(86) PCT No.: PCT/IL2020/050082
§ 371 (c)(1),
(2) Date: Jul. 20, 2021

(87) PCT Pub. No.: WO2020/152676
PCT Pub. Date: Jul. 30, 2020

(65) Prior Publication Data
US 2022/0097441 A1    Mar. 31, 2022

(30) Foreign Application Priority Data
Jan. 23, 2019  (IL) .......................................... 264422

(51) Int. Cl.
*B43L 13/20* (2006.01)
(52) U.S. Cl.
CPC .................................. *B43L 13/205* (2013.01)

(58) Field of Classification Search
CPC .... B43L 13/205; B43L 13/001; B43L 13/147; B43L 13/141; G09B 11/04
See application file for complete search history.

(56) References Cited

U.S. PATENT DOCUMENTS

| | | | | |
|---|---|---|---|---|
| 3,375,591 | A | * 4/1968 | Townsend, Jr. | ....... B43L 13/208 33/564 |
| 3,778,910 | A |  12/1973 | Smalligan | |
| 5,058,285 | A | * 10/1991 | Morita | ................... B43L 13/205 33/447 |
| 5,960,554 | A | * 10/1999 | Kamykowski | ........... G01B 3/14 33/562 |
| 6,112,425 | A |  9/2000 | Nelson et al. | |

(Continued)

FOREIGN PATENT DOCUMENTS

| CN | 1066243 A | 11/1992 |
|---|---|---|
| CN | 2157049 Y | 2/1994 |

(Continued)

OTHER PUBLICATIONS

International Search Report issued in Application No. PCT/IL2020/050082 dated Mar. 26, 2020, 3 pages.

(Continued)

*Primary Examiner* — Yaritza Guadalupe-McCall
(74) *Attorney, Agent, or Firm* — CANTOR COLBURN LLP

(57) ABSTRACT

The present invention relates to a drawing assisting tool, comprising at least one thin template with a set of solid and dashed grooved lines, in which said grooved lines are adapted to guide the drawing of at least one complete spatial body on a flat surface.

12 Claims, 3 Drawing Sheets

(56) References Cited

U.S. PATENT DOCUMENTS

| | | | | |
|---|---|---|---|---|
| 6,357,130 | B1* | 3/2002 | Rank | B43L 13/14 |
| | | | | 33/1 K |
| 7,055,259 | B2* | 6/2006 | Goldman | B43L 13/141 |
| | | | | 33/562 |
| 7,827,701 | B2* | 11/2010 | Wharton | B43L 13/201 |
| | | | | 33/562 |
| 8,915,739 | B2* | 12/2014 | Schulken | B43L 13/007 |
| | | | | 434/84 |
| 2006/0005411 | A1* | 1/2006 | Goldman | B43L 13/141 |
| | | | | 33/562 |
| 2009/0061394 | A1* | 3/2009 | Schulken | B43L 13/007 |
| | | | | 434/84 |
| 2015/0111182 | A1 | 4/2015 | Nelson | |
| 2021/0283944 | A1* | 9/2021 | Moghadampour | B43L 13/205 |
| 2022/0097441 | A1* | 3/2022 | Ben Haim | B43L 13/205 |

FOREIGN PATENT DOCUMENTS

| | | | | |
|---|---|---|---|---|
| CN | 101878488 | A | 11/2010 | |
| CN | 201808350 | U | 4/2011 | |
| CN | 103189189 | A | 7/2013 | |
| CN | 205344194 | U | 6/2016 | |
| CN | 108608758 | A | 10/2018 | |
| GB | 2246542 | A * | 2/1992 | A45C 11/36 |
| GB | 2539293 | A | 12/2016 | |
| KR | 2016001916 | A | 10/2016 | |
| KR | 101781001 | B1 | 9/2017 | |

OTHER PUBLICATIONS

Written Opinion issued in International Application No. PCT/IL2020/050082 dated Mar. 26, 2020, 5 pages.

* cited by examiner

DRAWING ASSISTING TOOL

CROSS-REFERENCE TO RELATED APPLICATIONS

This Application is a U.S. National Stage Application of PCT/IL2020/050082 filed Jan. 21, 2020 which claims priority to Israeli Application No. 264422 filed Jan. 23, 2019. Both of these applications are incorporated by reference in their entireties.

FIELD OF THE INVENTION

The invention is in the field of geometrical drawing instruments. More particularly, the present invention relates to a drawing assisting tool for enabling to draw a complete three-dimensional (3D) geometrical shape by using a template comprised of a single layer.

BACKGROUND OF THE INVENTION

Teaching three-dimensional (3D) drawing of geometric shapes is a well-known challenge for educators, particularly of young students in primary schools. Young students who have just began the assimilation of basic geometric shapes knowledge and drawing proficiencies, are aware of the distinguishing between two-dimensional (2D) shapes and 3D bodies, yet challenged with representing the latter in a two dimensional drawing.

In order to accomplish the drawing of a spatial body on a paper or on a class board, the student has to imagine or to reproduce (when being provided with a template or a 3D body sample) the spatial appearance of said body, considering the front face is similar to its 2D shape, the rear face is also similar to its 2D shape but is partially hidden (i.e., partially represented by dashed (hidden) lines) and the other faces has to be drawn relatively oblique and partially hidden. This complex task requires both spatial understanding and technical drawing skill, where the first primary target is to develop the student's spatial understanding, hence with the absence of sufficient 3D drawing aids, the secondary target—the technical drawing—consumes substantial class time at the expense of achieving the main target.

Providing a tool for assisting young students to easily draw a full 3D shape with all its seen and hidden contour lines on a timely manner would save precious class time on the course of achieving the abovementioned primary target. Furthermore, a 3D drawing tool with suitable guiding elements would allow a precise reproduction of the desired spatial body in a timely manner, thus will improve both young students' sense of self-efficacy and technical drawing proficiency.

The prior art in the field of geometrical drawing instruments offers a limited drawing assistance in the form of a ruler with partial 3D shapes contour lines and a reference point grooved into such ruler, e.g., as disclosed in KR101781001. The student can stencil 3-4 grooved contour lines while holding the ruler on top of a paper. Following the drawing of grooved lines and marking of reference point, the student is required to move the ruler aside and complete the desired shape's contour lines and rear and side faces seen/hidden lines representing the depth dimension, based on the partial guided drawing and reference point. The described partial guidance leaves much of the challenging technical drawing task unassisted, hence not resolving the abovementioned problem.

It can be understood that grooving a full set of guiding grooves for a complete 3D shape stencil template would define and easily cut away the full shape from said ruler, which makes it hard to produce a full grooved 3D shape stencil with all seen and hidden lines which would not break during manufacturing or regular use.

It is therefore an object of the present invention to provide an assisting drawing tool comprising a full set of solid and dashed grooves, guiding students through the drawing of a complete 3D shapes, referring to length, width and depth dimensions.

It is another object of the present invention to provide an assisting drawing tool comprising means for successive drawing of 3D shapes using a single template or a single layer with no need for moving or shifting said template until the drawing of the desired shape is accomplished.

It is yet another object of the present invention to provide a kit of durable grooved drawing templates suitable for non-delicate use by young students.

SUMMARY OF THE INVENTION

The present invention relates to a drawing assisting tool, comprising at least one thin template with a set of solid and dashed grooved lines, in which said grooved lines are adapted to guide the drawing of at least one complete spatial body on a flat surface.

According to an embodiment of the invention, the grooved lines are briefly discontinued at certain points in a manner that keeps the template areas between said grooved lines firmly and durably intact with the body of said grooved template.

According to an embodiment of the invention, each grooved line is designated with a guiding arrow, showing the drawing direction of said grooved line.

According to an embodiment of the invention, each grooved line is designated with a serial number, showing the drawing sequence of the grooved lines.

According to an embodiment of the invention, the at least one thin template is constructed of a flexible or rigid sheet of material.

According to an embodiment of the invention, the at least one thin template is constructed of metal or plastic material.

According to an embodiment of the invention, each thin template comprises an excessive protruding area.

According to an embodiment of the invention, the excessive protruding area of each template is stamped with a unique mark or word referring to the content of said template.

According to an embodiment of the invention, the location of protruding areas of the different templates of said kit do not cover each other, hence when said templates are stacked together, all excessive protruding areas are noticeable.

According to an embodiment of the invention, the grooved lines define a 3D geometric body.

According to an embodiment of the invention, a reference point is grooved in the center of one face or in the general center of the 3D geometrical body.

According to an embodiment of the invention, the peripheral shape of the templates is rectangular.

According to an embodiment of the invention, length scales are adapted into the templates, allowing further utilization of said templates for size measurements.

According to an embodiment of the invention, the drawing kit is provided with additional drawing templates, with sets of grooved lines and reference points which define two-dimensional geometric shapes.

DETAILED DESCRIPTION OF THE DRAWINGS

Figure 1:
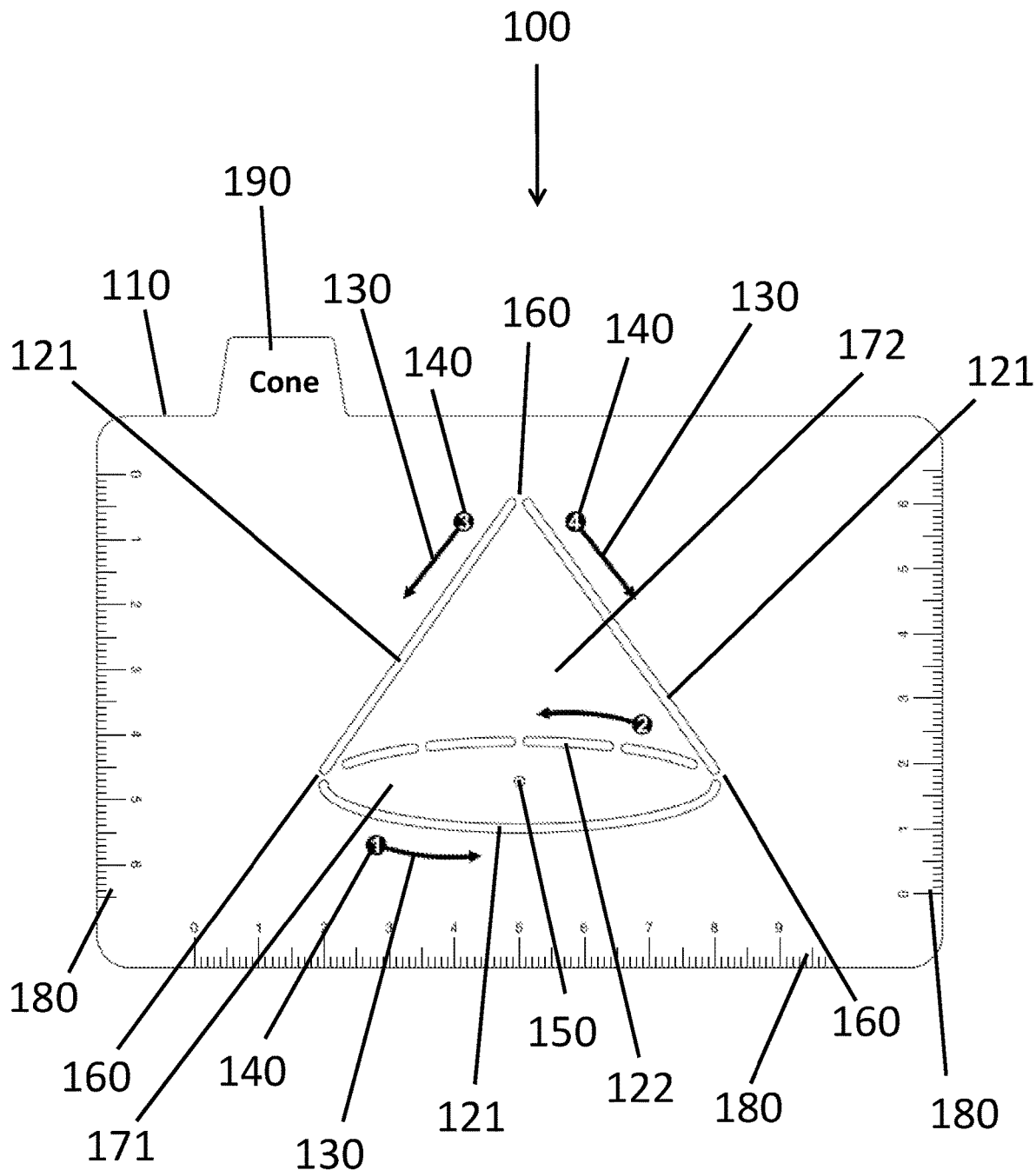
FIG. 1 schematically illustrates a drawing template that allows the drawing of a complete spatial body, according to an embodiment of the present invention.

The present invention relates to a drawing assisting tool or kit comprising at least one template which allows the drawing of complete spatial bodies including all seen/hidden lines and faces on a flat surface (e.g., paper, board) using a full set of solid and/or dashed grooved lines.

FIG. 1 shows an illustration of a drawing template 100 for drawing a complete 3D geometrical shape, according to an embodiment of the present invention. Template 100 comprises a thin plate 110 (e.g., of a rectangular contour), in which a set of solid grooved lines 121 and dashed grooved lines 122 are defining a 3D geometrical shape (e.g., in this figure of a 3D cone). According to an embodiment of the invention, each grooved line is accompanied with a directional arrow 130 and a serial number 140 showing the drawing sequence and drawing direction of grooved lines 121 and 122 to accomplish a successive drawing of the 3D geometrical shape (e.g., in this example, the 3D cone) using a single template.

According to an embodiment of the invention, drawing template 100 may further comprise a reference point 150 in the center of the 3D geometrical shape (e.g., as schematically illustrates in the cone's round base of FIG. 1). For example, reference point 150 may allow a user to link the newly learnt 3D cone to previously learnt 2D circle, thus enabling a better assimilation of the new learning.

It could be noticed that solid grooved lines 121 are briefly discontinued, but the discontinuation points 160 are of the minimum required size and locations to allow a durably intact structure of areas 171 and 172 between grooved lines 121 and 122 and plate 110, while keeping the shape integrity of the 3D cone. In the embodiment of FIG. 1 discontinuation points 160 are located in the vertices of areas 171 and 172, but in some embodiments of the present invention the discontinuation points can be differently located.

According to an embodiment of the invention, drawing template 100 is made of a flexible thin plate (i.e., thin plate 110 is flexible).

According to an embodiment of the invention, template 100 may further comprise marked scales in the perimeters of template 100, allowing further utilization of template 100, e.g., for size measurement.

According to an embodiment of the invention, template 100 may further comprise an excessive protruding area 190, marked with the distinguishing word "Cone", thus allowing the easy retrieval of the cone template from a stack of templates. Of course, the size and location of area 190, the distinguishing word and language can differ in different embodiments of the present invention. Furthermore, other distinguishing marking can be used, for example a down-sized cone representing the content of template 100.

FIGS. 2A-2F schematically illustrate several drawing templates, wherein each of which allows the drawing a complete spatial body of a different figure, according to an embodiment of the present invention. Similar to FIG. 1, each drawing template of FIGS. 2A-2F, comprises a set of solid grooved lines and dashed grooved lines that are used to define a different 3D geometrical shape. Optionally, each grooved line can be accompanied with a directional arrow and a serial number that shows the drawing sequence and drawing direction of the grooved lines to accomplish a successive drawing of the 3D geometrical shape, in a similar manner as described hereinabove with respect to template 100 of FIG. 1.

Figure 2A:
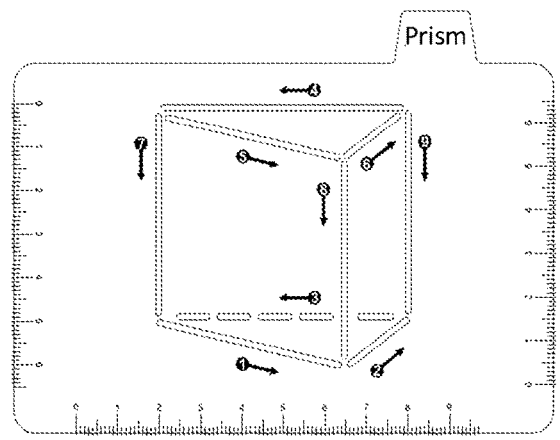
FIGS. 2A-2F schematically illustrate drawing templates, wherein each of which allows the drawing a complete spatial body of a different figure, according to an embodiment of the present invention.
Figure 2B:
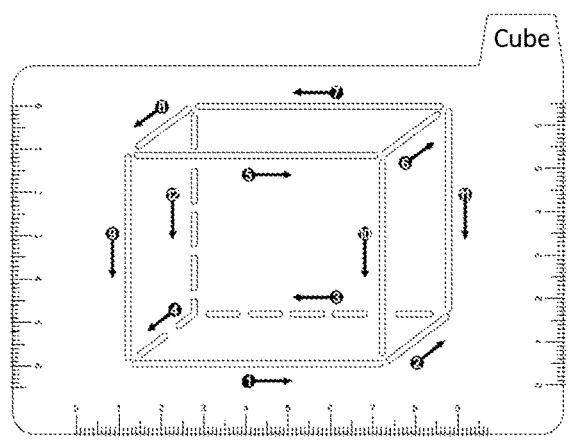
Figure 2C:
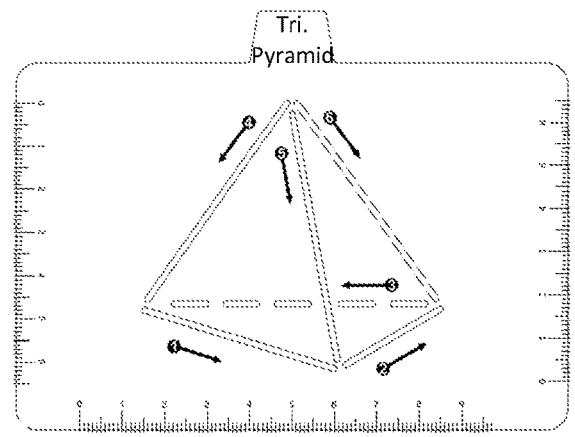
Figure 2D:
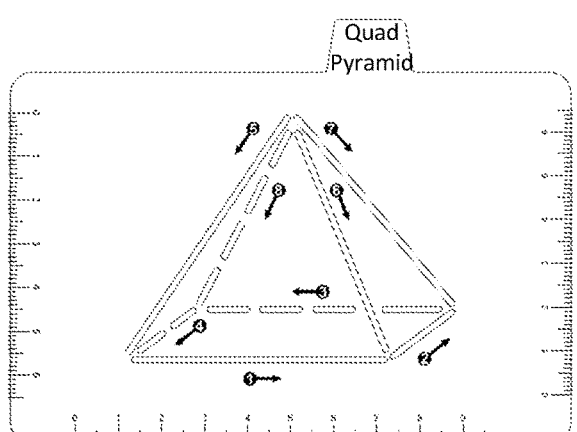
Figure 2E:
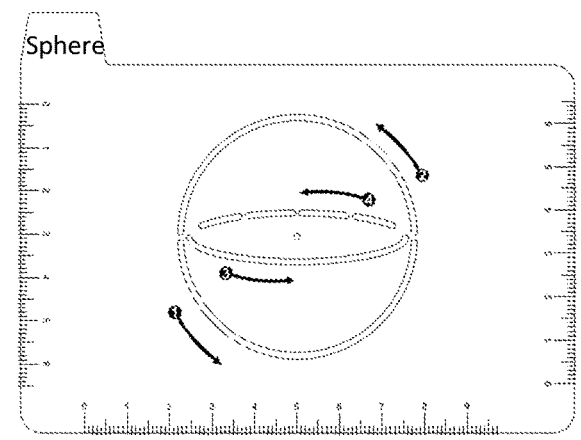
Figure 2F:
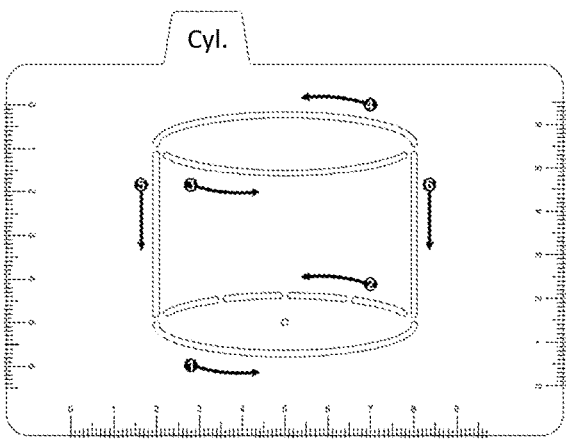

FIG. 2A schematically illustrates a drawing template of a 3D geometrical shape in form of a triangular prism. FIG. 2B schematically illustrates a drawing template of a 3D geometrical shape in form of a cuboid. FIG. 2C schematically illustrates a drawing template of a 3D geometrical shape in form of a triangular pyramid. FIG. 2D schematically illustrates a drawing template of a 3D geometrical shape in form of a quadrilateral pyramid. FIG. 2E schematically illustrates a drawing template of a 3D geometrical shape in form of a sphere. FIG. 2F schematically illustrates a drawing template of a 3D geometrical shape in form of a cylinder.

The drawing templates shown with respect to FIGS. 1 and 2A-2F can be used as a drawing kit for the drawing of complete spatial bodies including all seen/hidden lines and faces on a flat surface using a full set of solid and/or dashed grooved lines.

Figure 3:
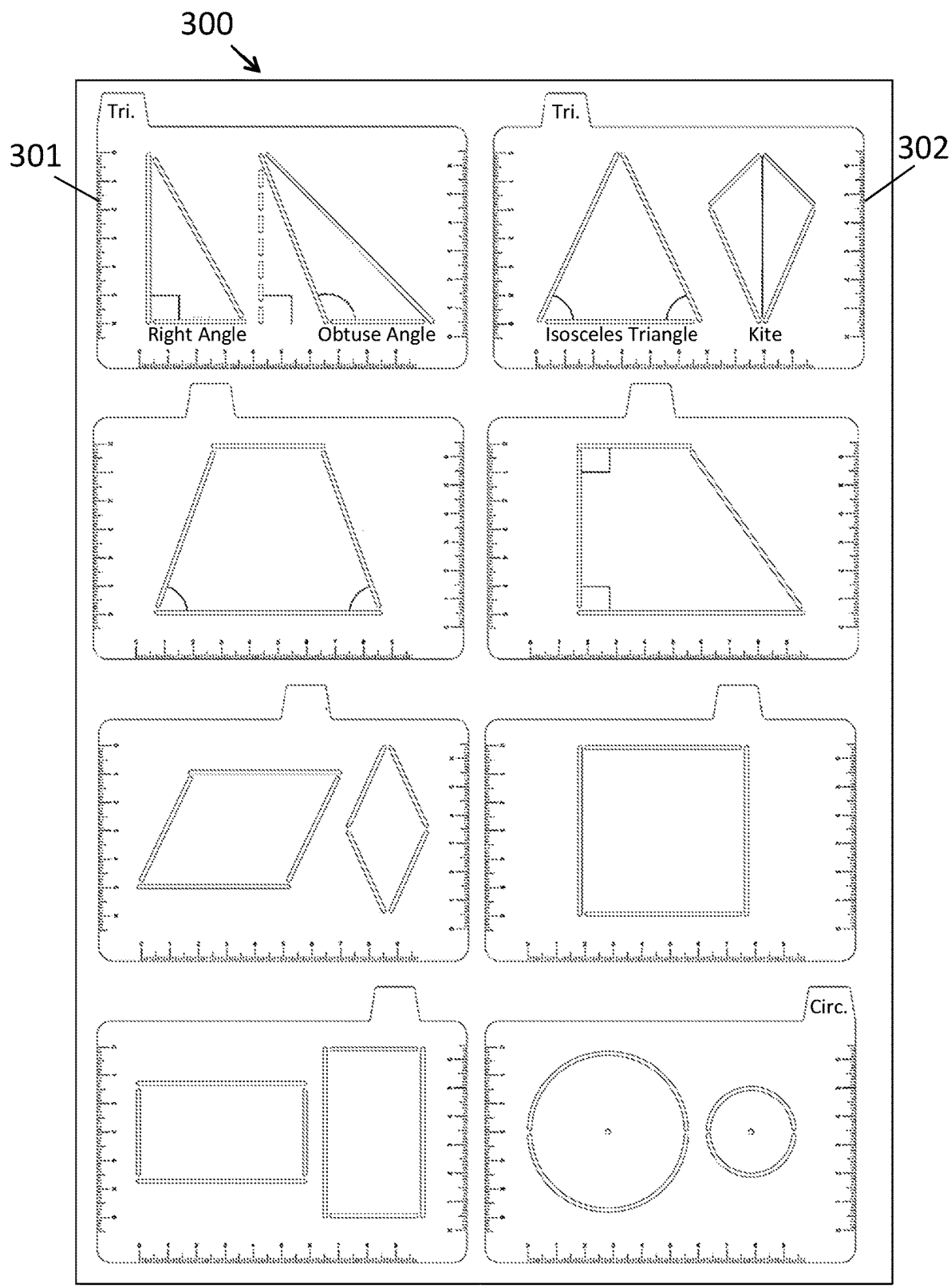
FIG. 3 schematically illustrates drawing templates, according to another embodiment of the invention.

According to an embodiment of the present invention, the above kit may further comprise additional templates. For example, FIG. 3 shows another embodiment of the present invention, in which the above kit is provided with a supplementary kit 300 of templates assisting the drawing of 2D geometric shapes in a similar manner as the drawing template of the 3D geometrical shapes described hereinabove. For example, a template 301 may assist the drawing of one or more 2D triangles, such as a right angle and an obtuse angle. Similarly, a template 302 may assist the drawing of an isosceles triangle and a kite. Other 2D templates of kit 300 may assist drawing circles, rectangles, etc. According to an embodiment of the invention, each 2D template may comprise visual indication associate with each geometrical shape, e.g., printed names, angles name, etc.

Although embodiments of the invention have been described by way of illustration, it will be understood that the invention may be carried out with many variations, modifications, and adaptations, without exceeding the scope of the claims.

The invention claimed is:

1. A drawing assisting tool, comprising at least one thin template, said thin template comprising an excessive protruding area and a set of solid and dashed grooved lines, in which said grooved lines are adapted to guide the drawing of at least one complete spatial body on a flat surface, and wherein the location of protruding areas of the different templates of said assisting tool do not cover each other, hence when said templates are stacked together, all excessive protruding areas are noticeable.

2. The drawing assisting tool of claim 1, in which the grooved lines are briefly discontinued at certain points in a manner that keeps the template areas between said grooved lines firmly and durably intact with the body of said grooved template.

3. The drawing assisting tool of claim 1, in which each grooved line is designated with a guiding arrow, showing the drawing direction of said grooved line.

4. The drawing assisting tool of claim 1, in which each grooved line is designated with a serial number, showing the drawing sequence of the grooved lines.

5. The drawing assisting tool of claim 1, in which the at least one thin template is constructed of a flexible or rigid sheet of material.

6. The drawing assisting tool of claim 1, in which the at least one thin template is constructed of metal or plastic material.

7. The drawing assisting tool of claim 1, in which the excessive protruding area of each template is stamped with a unique mark or word referring to the content of said template.

8. The drawing assisting tool of claim 1, in which the grooved lines define a 3D geometric body.

9. The drawing assisting tool of claim 1, in which a reference point is grooved in the center of one face or in the general center of the 3D geometrical body.

10. The drawing assisting tool of claim 1, in which the peripheral shape of the templates is rectangular.

11. The drawing assisting tool of claim 1, in which length scales are adapted into the templates, allowing further utilization of said templates for size measurements.

12. The drawing assisting tool of claim 1, in which the drawing assisting tool is provided with additional drawing templates, with sets of grooved lines and reference points which define two-dimensional geometric shapes.

\* \* \* \* \*